United States Patent [19]

Camloh et al.

[11] Patent Number: 4,767,246

[45] Date of Patent: Aug. 30, 1988

[54] QUICK-RELEASE TOOL HOLDING DEVICE

[75] Inventors: William J. Camloh, Lafayette; Charles Alcott, Canastota, both of N.Y.

[73] Assignee: Camloh Industries, Inc., Tully, N.Y.

[21] Appl. No.: 938,597

[22] Filed: Dec. 5, 1986

[51] Int. Cl.⁴ .......................... B23C 9/00; B23B 31/12
[52] U.S. Cl. ................................. 409/234; 279/81
[58] Field of Search .................. 409/234, 232; 279/81, 279/82, 77; 408/239 R, 239 A

[56] References Cited

U.S. PATENT DOCUMENTS

| | | | |
|---|---|---|---|
| 1,309,815 | 7/1919 | Schinkez | 279/81 |
| 1,433,527 | 10/1922 | Browand | 279/81 |
| 1,497,483 | 6/1924 | Callender | 279/81 |
| 1,888,685 | 11/1932 | Norling | 279/81 |
| 2,384,600 | 9/1943 | Cherry | 279/81 |
| 2,948,559 | 8/1960 | Recker | 279/77 X |
| 3,396,981 | 8/1968 | Hammond | 279/77 X |
| 3,498,624 | 3/1970 | Hammond et al. | 279/81 |
| 3,708,178 | 1/1973 | Lauricella | 279/81 |
| 3,741,573 | 6/1973 | Treer | 279/81 |
| 3,747,946 | 7/1973 | Edens | 279/81 |
| 4,188,041 | 2/1980 | Soderberg | 279/81 X |
| 4,231,581 | 11/1980 | Benedict | 279/81 X |

FOREIGN PATENT DOCUMENTS 381049 10/1964 Switzerland ................ 279/81

Primary Examiner—William R. Briggs
Attorney, Agent, or Firm—Wall and Roehrig

[57] ABSTRACT

A quick-release tool holding device as a tool holder formed of a sleeve and a shoulder having an undercut annular tapered surface, with a tool holder retaining head that has a cylindrical bore into which the tool holder sleeve fits, with the tool holder shoulder abutting against an end of the sleeve. The retaining head has a quick-release retainer mechanism in which a plurality of button members releaseably engage the tapered surface of the tool holder. These button members are moved by rotating an annular collett or ring which induces cam action of the buttons into and out of engagement with the tool holder. This quick-release tool holder mechanism is favorably employed in a multiple spindle mechanism mounted on a tooling machine.

14 Claims, 4 Drawing Sheets

QUICK-RELEASE TOOL HOLDING DEVICE

BACKGROUND OF THE INVENTION

This invention relates to tool holders, and is more particularly directed to a quick-release holder for holding machine tools such as drills, routers, reamers, etc. The invention is also directed to a multiple spindle head that employs such quick-release tool holders.

A number of quick-release type mandrels or spindles for machine tools have been previously proposed, with their object being to facilitate interchange of one tool with another tool, and to hold tools in a precise predetermined position in the tooling machine.

One class of these previously proposed tool holders employs balls or ball-like retaining devices which enter recesses in the shank of a tool or fitting on the tool. Devices of this type appear in U.S. Pat. Nos. 2,384,600 to Cherry; 3,708,178 to Lauricella; 3,747,946 to Edens; and 3,741,573 to Treer. In these devices the spherical-surface gripping balls do have some play in the machine tool recess when in the engaged position so large manual forces on a change-over handle are typically needed to ensure proper seating. This means that either a handle must extend outward from the holder, or else a separate wrench is required. In the former case, the handle can disturb the rotational stability of the head, thereby limiting the unit to very slow speed use. In the latter case, the requirement of a separate wrench significantly reduces the effectiveness of the quick release or quick change feature.

Moreover, Applicant is unaware of any multiple-spindle tool holder, i.e., in which the machine tool output shaft provides rotary power to a number of rotary machine tools, and which also incorporates quick-release mechanisms for the various spindles so that the tools can be quickly interchanged.

OBJECTS AND SUMMARY OF THE INVENTION

Accordingly, it is an object of this invention to provide a quick-release tool holder mechanism that is a distinct improvement over current tool holders for machine tools.

It is another object of this invention to provide a quick-release tool holder that securely and accurately seats tools in the machine tool spindle, and also effects release of the tools by simple rotation of a ring or collar.

It is a still further object of the invention to provide a multiple-spindle tool holder for holding and operating a number of machine tools at the same time, each of which can be quickly interchanged for another machine tool.

According to an aspect of this invention, a quick-release tool holding mechanism is incorporated into the spindle of a rotary tooling machine. This mechanism is comprised of a tool holder portion and a tool retaining head portion that releasably holds the tool holder portion.

The tool holder portion is adapted to have a tool attached at a distal (i.e. lower) side, either with the shaft of the tool being retained in a sleeve in the holder by means of a set screw, or with the tool and holder being integrally formed. At the upper or proximal side, the tool holder portion has a male sleeve that has a shank and a radially projecting shoulder. The shoulder has an undercut annular tapered surface, e.g., a conic groove, just below, or distally of, the top of the shoulder.

The tool holder retaining head portion includes a sleeve portion that has a cylindrical hole or bore into which the shank of the tool holder fits. This sleeve portion includes retaining pins or equivalent structure permitting axial movement of the tool holder shank relative to the sleeve portion, but locking the same against mutual rotation when the tool holder is inserted. The retaining head also comprises a quick release retainer mechanism formed of an annular flange that is affixed onto the distal, or lower end of the sleeve member, and three retainer buttons which releaseably engage the tapered surface of the tool holder portion. An annular collar is supported on the flange and rotates about it by a twist of the operator's hand. A cam mechanism is supported on the flange to turn with the collar for moving the button members radially between engaged and disengaged positions, i.e., in which the button members bias against the tapered surface of the tool holder and in which the button members are clear of the shoulder of the tool holder portion, respectively. Preferably, the button members are disc-like elements, in which a disc member is provided with a coaxial projecting stud member. The stud slides in a groove in the annular flange so that the disc member moves radially in and out under urging of the cam mechanism. A peripheral conic surface on the button disc member engages the tapered surface of the tool holder shoulder. Also, preferably, the cam mechanism includes a respective three cam segments each of which effects radial travel of an associated one of the button members. A spring associated with each cam segment urges the mechanism towards the engaged position.

This invention permits the convenient configuration of a multiple-spindle quick release tool holder for a rotary tooling machine, which can comprise an input shaft, a plurality of output spindles, a housing supporting the input shaft and the spindles, and a belt drive or other transmission means for powering the spindles from the input shaft. Each of the spindles incorporates the above-described tool holder mechanism, i.e., the tool holder and retaining head arrangement, as described hereinabove.

Of course, for each spindle fitted with a retaining head, several tool holders would be provided, one for each tool to be used. These tools could be drill bits, reamers of various diameters or milling tools of different grades or configurations.

With the tool holders and retaining head of this invention, change over of a machine tool can be carried out, e.g., of a ⅜" drill bit for a ½" end mill, in approximately five seconds. This is done without requiring a wrench or any other separate tool, simply by rotating the collar of the retaining head.

The above and many other objects, features, and advantages of this invention will be more fully understood from the ensuing description of the preferred embodiment of this invention, which is to be considered in connection with the accompanying drawing.

DETAILED DESCRIPTION OF THE PREFERRED EMBODIMENT

Figure 1:
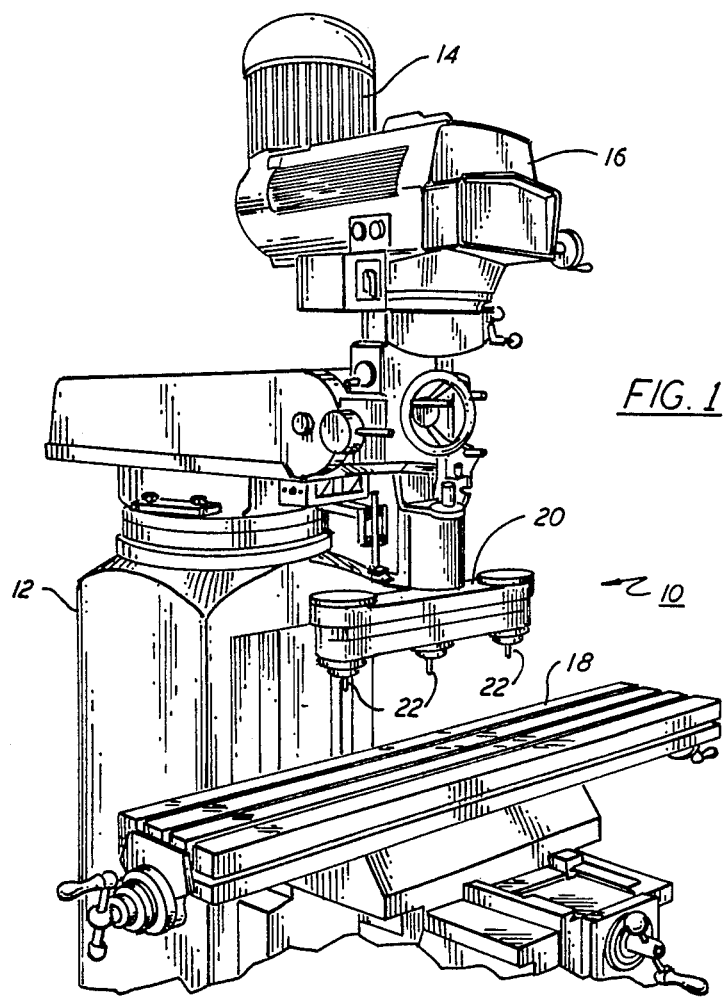
FIG. 1 is a perspective illustration of a milling machine that incorporates a multiple-spindle head, which includes for each spindle a quick-release tool holding mechanism according to an embodiment of this invention.

With reference to the drawing, FIG. 1 shows in general a milling machine 10 comprising a stand 12 with a motor 14 coupled to a gear box or other drive assembly 16. A bench 18 is situated beneath the drive assembly 16 and a multiple-spindle head 20 depends from the drive assembly 16. The spindles of the multiple-spindle head 20 each support a rotary tool 22, such as a drill bit, reamer, router, or end mill.

Figure 2:
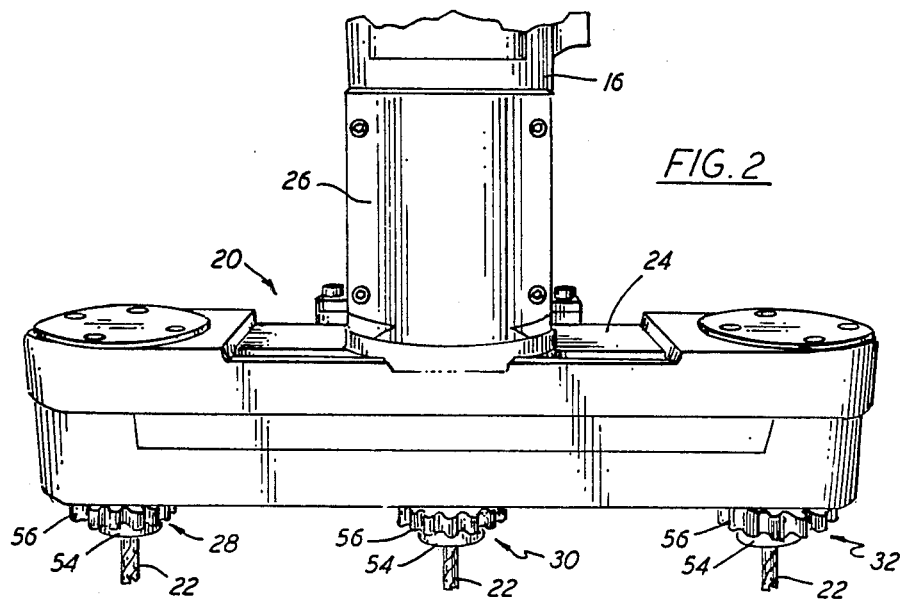
FIG. 2 is an enlarged perspective view of the multiple-spindle head of FIG. 1.
Figure 3:
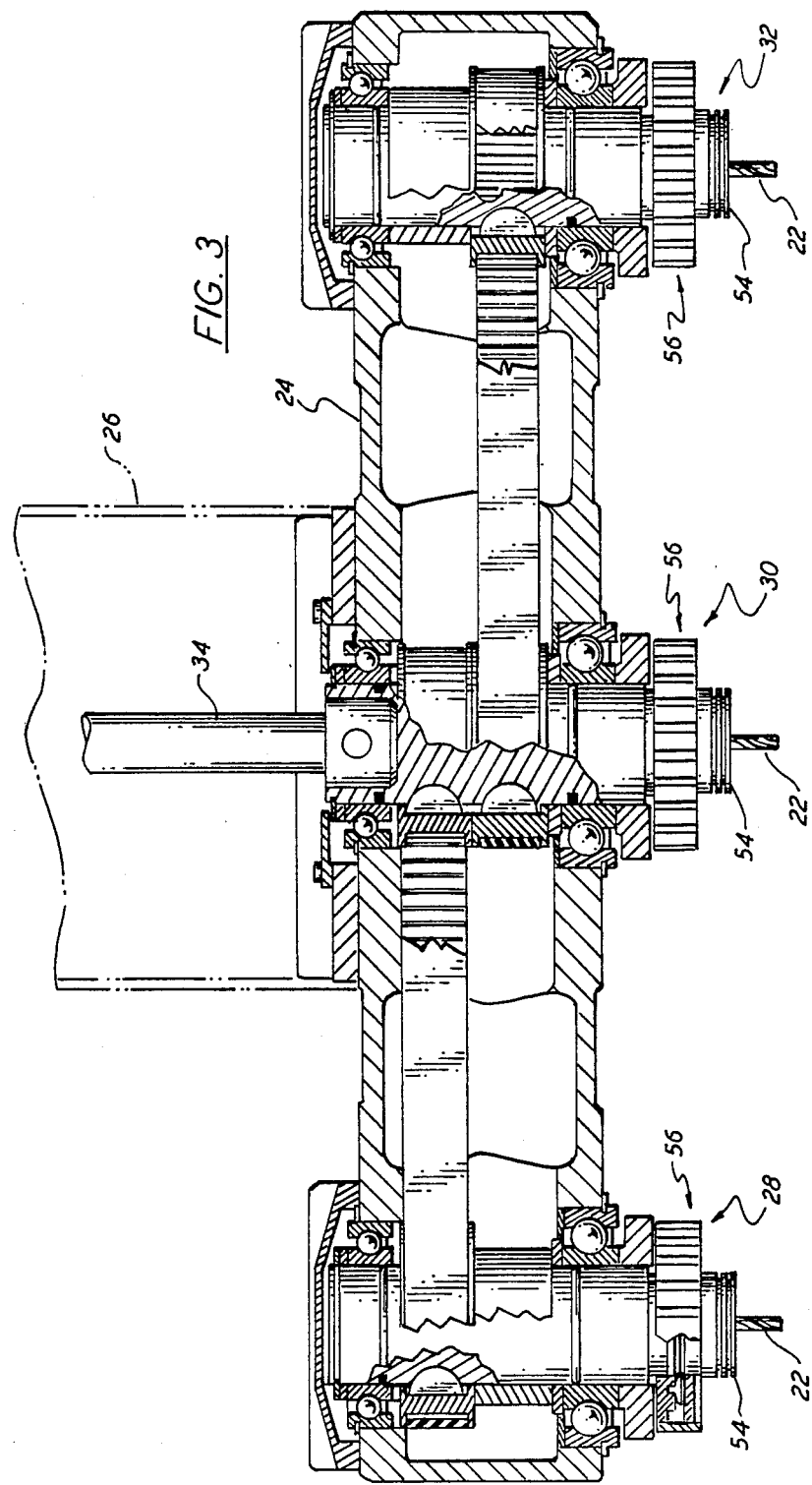
FIG. 3 is a fragmentary perspective view of the multiple-spindle head of FIG. 2.

As shown in FIGS. 2 and 3, the multiple-spindle head 20 has a housing 24, preferably of Almag, with a neck or sleeve 26 that is used to mount the head 20 onto the drive assembly 16. At the lower side of the head 20 there are first, second and third output spindles 28, 30, and 32, respectively situated at the left, center, and right of the head 20. Each of the spindles 28, 30, and 32 is of the quick-release type, as described hereinbelow.

As shown in FIG. 3, the multiple-spindle head has an input shaft 34 which is directly coupled to the center spindle 30, and is rotationally supported on upper and lower bearings 36 and 38. The spindles 28 and 32 are likewise supported on similar upper and lower bearings.

An upper timing belt 40 connects a sprocket wheel 42 on the second spindle 30 to a sprocket wheel 44 on the left spindle 28. A similar timing belt 46 connects a sprocket wheel 48 on the center spindle 30 to a sprocket wheel 50 on the right spindle 32. The input shaft 34 mounts readily to a single spindle head of a conventional milling machine to convert the same to a three-spindle machine. This multiple spindle head arrangement 20 can be mounted on the milling machine 10 in a matter of minutes.

Each of the three spindles 28, 30, and 32 has a quick-release tool holder mechanism 52, which is illustrated in FIGS. 4A, 4B, 5 and 6.

The quick-release tool holder mechanism 52 is formed of two mating components, namely a tool holder 54 which holds the shank of a standard rotary tool 22, such as an end mill, router, reamer, drill bit, etc.; and a tool holder retaining head 56 which is held by a chuck, jaw, collet, or retaining draw bar in each of the spindles 28, 30, and 32.

Figure 4B:
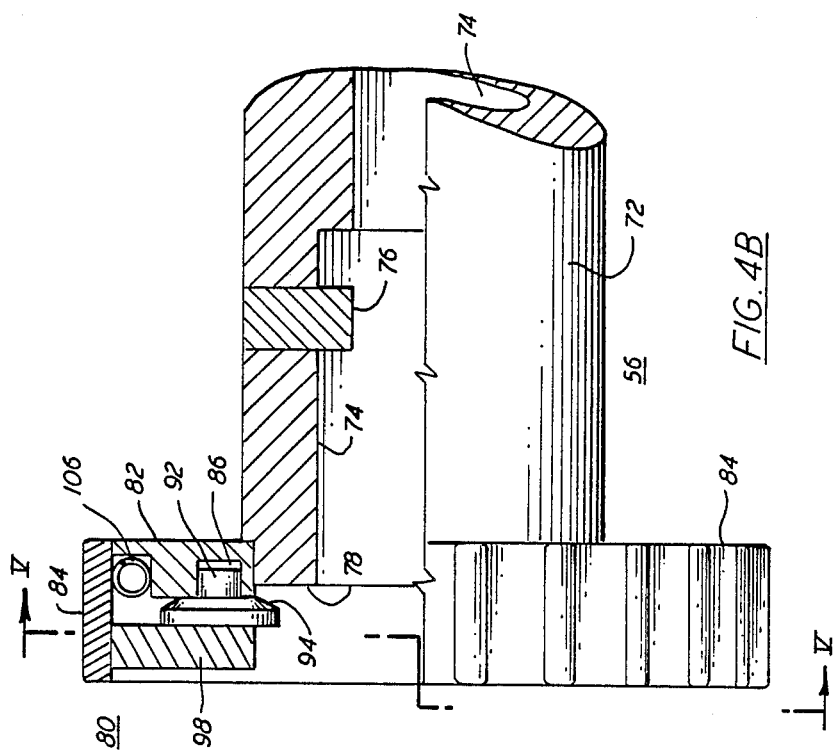
FIG. 4A and FIG. 4B are isometric partial sectional views of the tool holder and retainer head portions, respectively, of the quick-release tool holding mechanism of FIG. 1.
Figure 4A:
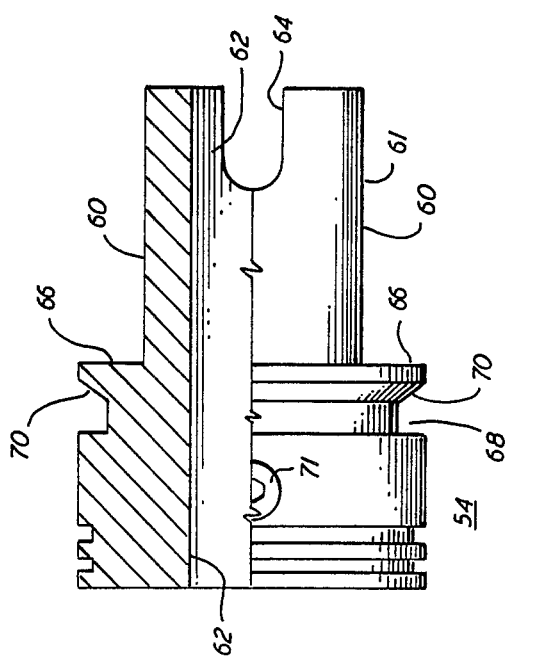
Figure 6:
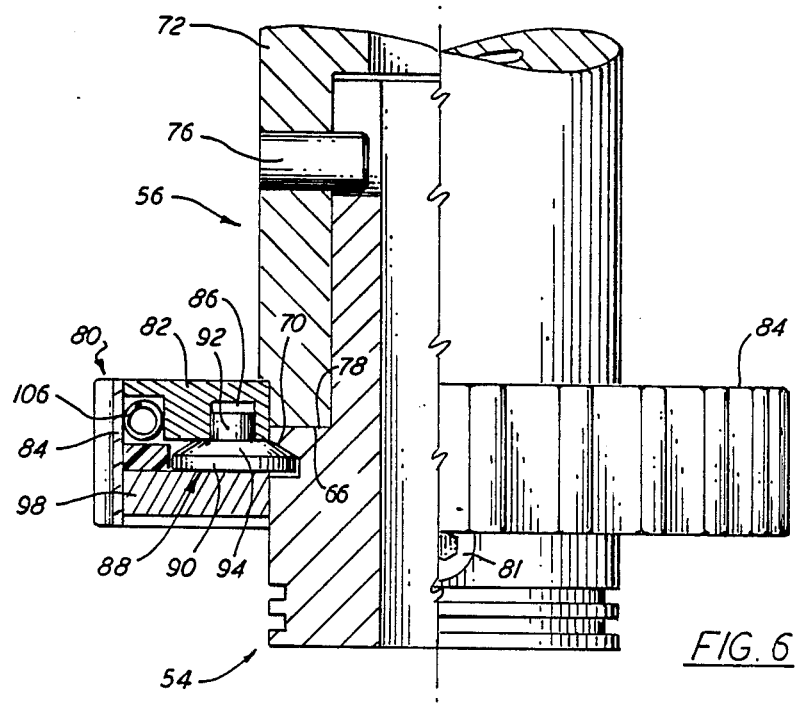
FIG. 6 is an elevational view, partly in section, of the tool holder and retaining head engaged together.

As shown in FIGS. 4A and 6, the tool holder 54 has a cylindrical sleeve 60 with a central bore 62 therein and a pair of opposed slotted openings 64 at the proximal end (to the right in FIG. 4A) of a shank portion 61 of the sleeve. The tool holder 54 has an annular radially-extending shoulder 66 at the distal end of the shank portion 61, and an undercut channel 68 with a tapered surface 70, i.e., a frustonconic surface is situated, just beneath the shoulder 66. The tool 22 has its shank inserted into the distal end of the bore 62, and is secured by means of a set screw 71.

The tool holder retaining head 56 has a cylindrical sleeve portion 72 which fits into a chuck or mandrel of the spindle 28, 30, or 32. This sleeve portion 72 has an axial cylindrical bore 74 which mates with the shank portion 61 of the tool holder sleeve 60. A pair of drive pins 76 project radially inward at the proximal end of the bore 74 at a 180 degree spacing from one another. These drive pins 76 fit into the slotted openings 64 in the tool holder sleeve 60 and provide a means permitting axial motion of the tool holder 54 for insertion or removal thereof into the retaining head 56, but restraining the holder 54 and head 56 against mutual rotation.

A distal end surface 78 of the sleeve portion 72 is intended to mate with the shoulder 66 of the tool holder sleeve 60, and abuts against the same when the tool holder 54 is in place in the retaining head 56, as shown in FIG. 6.

The retaining head 56 also has a retainer mechanism 80 for releasably gripping the holder 54. Here, an annular flange 82 is mounted at the distal end of the sleeve portion 72. A milled steel ring or collar 84 is carried on the flange 82 and rotates around it when twisted by an operator's hand.

Figure 5:
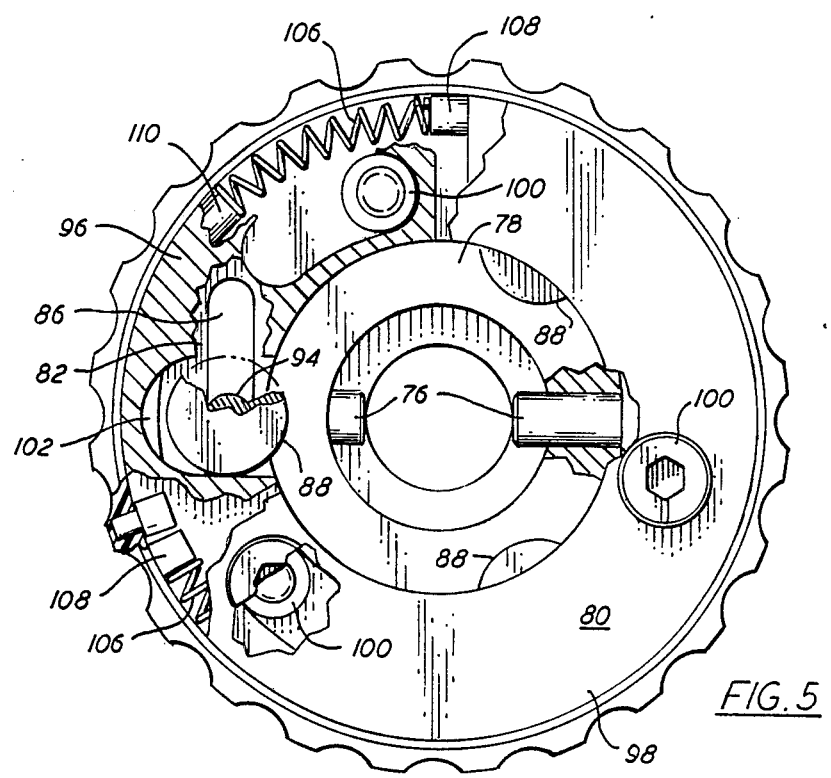
FIG. 5 is a sectional plan view, partly cut away, of the retainer head taken along the line V—V of FIG. 4B.

As shown in FIG. 5, the flange 82 has longitudinal slots 86, which extend generally in the circumferential direction on the flange 82, but with one end thereof somewhat closer to the center or axis of the head than the other end. A retaining button member 88 is carried in each of these slots. Perhaps better seen in FIG. 6, each button member 88 is formed of a disc portion 90 with a central stud portion 92 that protrudes into the slot 86; the disc portion 90 having a conic or other tapered surface 94 at its periphery. This tapered surface 94 mates with the tapered surface 70 of the undercut channel 68 behind the shoulder 66 of the tool holder 54.

The retainer mechanism 80 is also provided with three cam sectors 96 which are formed of a plastic resin material, and which are carried on the annulus between the flange 82 and an annular cover plate 98. The cover plate 98 is affixed in spaced relation to the flange 82 by means of retaining bolts 100.

As seen in FIG. 5 each cam section 96 has a cam opening 102 which extends generally in the radial direction, for moving the associated cam button member into and out of engagement with the tool holder 54 when the ring 84 and the attached cam sectors 96 are rotated. In this illustrated embodiment, the button members 88 move out of engagement when the ring 84 is rotated clockwise as in FIG. 5, and into engagement when the ring 84 is rotated counterclockwise.

As shown in FIG. 5, end cam sector 96 has an arcuate slot 104 to accomodate the associated retaining bolt 100. Also a compression spring 106 is seated between a stop 108 on the flange and another stop 110 on the ring 84.

When the tool holder 54 with the attached tool is inserted, the sleeve 60 fits into the bore 74 and the shoulder 66 of the tool holder 54 abuts the end surface 78. When the retaining button members 88 are cammed into engagement with the undercut tapered surface 70 of the tool holder 54, the tool holder 54 is held tightly in the retaining head 56 with the shoulder 66 snugged up against the end surface 78, as shown in FIG. 6. This provides an accurate and repeatable seating of the tool and tool holder within the tooling machine 10.

The quick-change tool holder arrangement described hereinabove uses a single "V" groove to help locate and lock the tool holder within the head 56.

When the tool holder 54 is fully seated and the slotted opening 64 are situated over the driving pins 76, the grooved ring 84 can simply be released, and the spring action of the springs 106 will cause the cam sectors 96 to rotate back and drive the button members 88 back to the locked or engaged position, as shown in FIG. 6.

It should be apparent that the tool holder 54 and the tool holder retaining head 56 are symmetrical and rotationally balanced, so that the tool 22, tool holder 54 and head 56 can all rotate together in the spindle 28, 30, or 32 at any desired speed without eccentricity vibration.

To swap one tool for another, the operator simply stops the spindle 28, 30, and 32, and rotates the grooved ring 84, removes the tool 22 and tool holder 54, replaces them with a different tool and its tool holder 54, and then simply releases the ring 84. The entire process of inserting and removing the tool holders takes approximately five seconds. This clearly creates an advantage for machine operators who must use different tools to conduct successive machining steps on a workpiece.

While the invention has been described in detail with respect to a single preferred embodiment, it should be recognized that the invention is not limited to that precise embodiment, but that many modifications and variations would present themselves to those of skill in the art without departing from the scope and spirit of this invention, as defined in the appended claims.

What is claimed is:

1. Quick-release tool holding device comprising a tool holder adapted to have a tool attached at a distal side thereof and including a proximal male sleeve having a shank, and a shoulder having an undercut annular tapered surface on the distal side thereof, and a tool holder retaining head including a sleeve portion having a cylindrical hole into which said shank fits with means permitting axial movement of said tool holder shank relative to said sleeve portion, but locking the same against mutual rotation, and a quick release retainer mechanism having an annular flange affixed onto the distal end of said sleeve member, a plurality of generally disk-like button members which releasably engage the tapered surface of said tool holder, an annular collar supported on said flange for rotation with respect thereto, and cam means mounted to turn with said collar for moving said button members radially between engaged and disengaged positions, respectively, in which engaged position said button member sloping surfaces are disposed against said tool holder tapered surface and in which disengaged position said button members are clear of the shoulder of said tool holder.

2. The quick-release tool holding device of claim 1 in which said means locking the tool holder sleeve and the retainer head sleeve portion against mutual rotation includes a least one lug projecting radially into said cylindrical hole; said tool holder shank having a corresponding at least one slotted opening at its proximal end.

3. The quick-release tool holding device of claim 1 wherein there are three of said button members disposed at regular intervals about said annular flange.

4. The quick-release tool holding device of claim 3, wherein said cam means includes a respective three cam segments each of which has a camming surface which effects radial travel of a respective one of said button members when said cam segments rotate.

5. The quick-release tool holding device of claim 3 wherein said cam means includes means to urge button members to rotate therewith; said button members each have a stud projecting axially therefrom; and said flange has three respective cam slots in which said studs travel, each said cam slot extending generally circumerentially, but closer at one end to the axis of the retainer head sleeve portion that at the other end.

6. The quick-release tool holding device of claim 1, wherein said cam means includes at least one cam member and resilient biasing means coupled between said cam member and said flange for urging said cam member in the engaged position of said button members.

7. The quick-release tool holding device of claim 5, wherein said button members each have a disc member coaxial with the stud thereof, and the sloping surfaces of said button members are peripheral conic surfaces.

8. A multiple-spindle quick-release tool holder for a rotary tooling machine, and comprising an input shaft, a plurality of output spindles which rotate together as powered by said input shaft, a housing supporting said input shaft and said spindles, and transmission means coupling said input shaft to said spindles to transmit rotational power thereto; wherein each of said spindles incorporates a quick-release tool holder device that includes a tool holder adapted to have a tool attached thereto at a distal side thereof and having a proximal male sleeve that is formed of a shank and a radially projecting shoulder that has an undercut annular tapered surface on its distal side, and that also includes a tool holder retaining head having a female sleeve portion into which said shank fits with means therein permitting axial movement of said tool holder shank relative to said sleeve portion but locking the same against mutual rotation and a quick-release retainer mechanism having an annular flange affixed onto the distal end of said sleeve member, a plurality of generally disk-like button members which releasably engage the tapered surface of said tool holder, an annular collar supported on said flange for rotation with respect thereto, and cam means mounted to turn with said collar to move said button members between engaged and disengaged positions, respectively, with said tool holder.

9. A multiple-spindle quick-release tool holder according to claim 8 in which said transmission means includes a timing belt and sprocket arrangement rotationally coupling said input shaft to said spindles.

10. A multiple-spindle quick-release tool holder according to claim 8 in which for each said tool holding device there are three of said button members disposed at regular intervals about said annular flange.

11. A multiple-spindle quick-release tool holder according to claim 8 in which each of said button members are formed of a disc member and a coaxial projecting stud.

12. A multiple-spindle quick-release tool holder according to claim 11 in which said cam means includes means to urge said button members to rotate therewith and said flange has respective cam slots thereon in which said button member studs travel, each said cam slot extending generally circumferentially, but radially closer at one end than the other to the axis of the retainer head sleeve portion.

13. A multiple-spindle quick-release tool holder according to claim 10 in which said cam means includes a respective three cam segments each of which has a camming surface to effect radial travel of an associated one of said button members.

14. A multiple-spindle quick-release tool holder according to claim 13 in which said cam sectors each have an associated biasing spring acting between the cam sector and the flange to urge said cam sectors and the associated button members towards their engaged position.

* * * * *